(12) United States Patent
Christensen

(10) Patent No.: US 7,778,155 B2
(45) Date of Patent: Aug. 17, 2010

(54) BROADCAST ROUTER CONFIGURED FOR ALTERNATELY RECEIVING MULTIPLE OR REDUNDANT REFERENCE INPUTS

(75) Inventor: Carl Christensen, South Jordan, UT (US)

(73) Assignee: Thomson Licensing, Boulogne-Billancourt (FR)

( * ) Notice: Subject to any disclaimer, the term of this patent is extended or adjusted under 35 U.S.C. 154(b) by 1076 days.

(21) Appl. No.: 10/518,278

(22) PCT Filed: Jun. 17, 2003

(86) PCT No.: PCT/US03/19600

§ 371 (c)(1),
(2), (4) Date: Dec. 15, 2004

(87) PCT Pub. No.: WO04/001987

PCT Pub. Date: Dec. 31, 2003

(65) Prior Publication Data

US 2005/0226211 A1 Oct. 13, 2005

Related U.S. Application Data

(60) Provisional application No. 60/390,742, filed on Jun. 21, 2002.

(51) Int. Cl.
*H04L 1/00* (2006.01)
(52) U.S. Cl. .................. 370/216; 370/390; 370/503; 348/513
(58) Field of Classification Search ............. 370/390, 370/366, 392, 503, 216, 410; 704/500; 379/196; 725/78; 348/513
See application file for complete search history.

(56) References Cited

U.S. PATENT DOCUMENTS 3,829,777 A * 8/1974 Muratani et al. ............... 455/8
5,550,594 A * 8/1996 Cooper et al. ............... 348/513
5,841,775 A * 11/1998 Huang ......................... 370/422

(Continued)

FOREIGN PATENT DOCUMENTS

JP 55-53956 4/1980

(Continued)

OTHER PUBLICATIONS

Bytheway, "Is Your Plant Infrastucture Up to Handling Multichannel Digital Audio", Sep. 2000, all pages.*

(Continued)

*Primary Examiner*—Kwang B Yao
*Assistant Examiner*—Jeffrey M Rutkowski
(74) *Attorney, Agent, or Firm*—Robert D. Shedd; Robert B. Levy

(57) ABSTRACT

A broadcast router includes a router matrix having input and output sides. Coupled to the input side of the router matrix are first and second reference inputs. The first reference input is configured for application of a first reference signal thereto while the second reference input is configured for selective application of either a second reference signal or a redundancy of the first reference signal thereto. The broadcast router further includes N inputs, M outputs and a routing engine, coupled between the N inputs and the M outputs, for applying selected ones of the N inputs to the M outputs. A reference select circuit is coupled between the first and second reference inputs and the routing engine.

14 Claims, 3 Drawing Sheets

U.S. PATENT DOCUMENTS

| | | | |
|---|---|---|---|
| 5,995,503 A | 11/1999 | Crawley et al. | |
| 6,104,997 A * | 8/2000 | Shuholm | 704/500 |
| 6,204,732 B1 | 3/2001 | Rapoport et al. | |
| 6,330,316 B1 * | 12/2001 | Donak et al. | 379/196 |
| 6,680,939 B1 * | 1/2004 | Lydon et al. | 370/366 |
| 6,826,778 B2 * | 11/2004 | Bopardikar et al. | 725/145 |
| 7,212,525 B2 * | 5/2007 | Moriwaki et al. | 370/386 |
| 2002/0031148 A1 * | 3/2002 | Watanabe et al. | 370/503 |
| 2002/0031334 A1 * | 3/2002 | Tanizawa et al. | 386/54 |

FOREIGN PATENT DOCUMENTS

| | | |
|---|---|---|
| JP | 63-73754 | 4/1988 |
| JP | 6-14013 | 6/1994 |
| JP | 2000049841 A | 2/2000 |
| WO | WO01/78270 A2 | 10/2001 |
| WO | WO02/23811 A | 3/2002 |

OTHER PUBLICATIONS

Bytheway D.L: "Digital Audio Distribution Switcher System" SMPTE Journal, SMPTE Inc. Scarsdale, NY., US vol. 99, No. 10, Oct. 1990, pp. 804-808, XP000159085 ISSN: 0036-1682 *the whole document*.

Search Report dated Nov. 26, 2003.

* cited by examiner

BROADCAST ROUTER CONFIGURED FOR ALTERNATELY RECEIVING MULTIPLE OR REDUNDANT REFERENCE INPUTS

CROSS REFERENCE

This application claims the benefit, under 35 U.S.C. §365 of International Application PCT/US03/19600, filed Jun. 17, 2003, which was published in accordance with PCT Article 21(2) on Dec. 31, 2003 in English and which claims the benefit of U.S. provisional patent application No. 60/390,742, filed Jun. 21, 2002.

FIELD OF THE INVENTION

The present invention relates to broadcast routers and, more particularly, to a broadcast router configured for alternately receiving multiple or redundant reference inputs at an input side thereof.

BACKGROUND OF THE INVENTION

A broadcast router allows each one of a plurality of audio outputs therefrom to be assigned the signal from any one of a plurality of audio inputs thereto. For example, an N×M broadcast router has N audio inputs and M audio outputs coupled together by a router matrix which allows any one of the N audio inputs to be applied to each one of the M audio outputs. In addition, a broadcast router requires at least one reference input. A variety of reference signals which may be applied to a reference input are known. They include, among others, a video black reference signal, a tri-level synchronization signal and a digital audio reference signal ("DARS"). Reference signals such as these may be used by the broadcast router for a variety of purposes. Oftentimes, a reference signal is used to time switches within the broadcast router. A broadcast router may also use a reference signal for synchronization purposes. For example, a broadcast router may retime its audio outputs to be closer to the reference signal than to the audio inputs. Prior broadcast routers used phased lock loop techniques to continually align its audio outputs to the incoming reference signal. Since an attempt to synchronized a non-synchronous signal will damage the signal, such broadcast routers also required the use of a sync/non-sync detection circuit which determined whether the output audio signal should be synchronized.

Broadcast routers having multiple reference inputs are known in the art. In the past, however, multiple reference inputs have been predefined as either redundant or independent. If the multiple reference inputs were redundant to one another, the same reference signal would be supplied to each reference input. Conversely, if the multiple reference inputs were independent of one another, a different reference signal would be supplied to each reference input. Once predefined as either redundant or independent, the multiple reference inputs could not be used as the other unless the broadcast router was physically modified in some fashion, for example, by actuating a physical switch or selecting a setting using a graphical user interface ("GUI").

SUMMARY OF THE INVENTION

A broadcast router includes a first reference input, a second reference input, a reference select circuit coupled to the first and second reference inputs and at least one router component coupled to the reference select circuit. The reference select circuit is configured to: (1) pass a first signal applied to the first reference input to the at least one router component as a first reference signal and pass a second signal applied to the second reference input to the at least one router component as a second reference signal upon determining that the first and second signals are error-free; (2) pass the first signal to the at least one router component as the first reference signal and as the second reference signal upon determining that the first signal is error-free and the second signal is not error-free; and (3) pass the second signal to the at least one router component as the first reference signal and as the second reference signal upon determining that the first signal is not error-free and the second signal is error-free.

DETAILED DESCRIPTION

Figure 1:
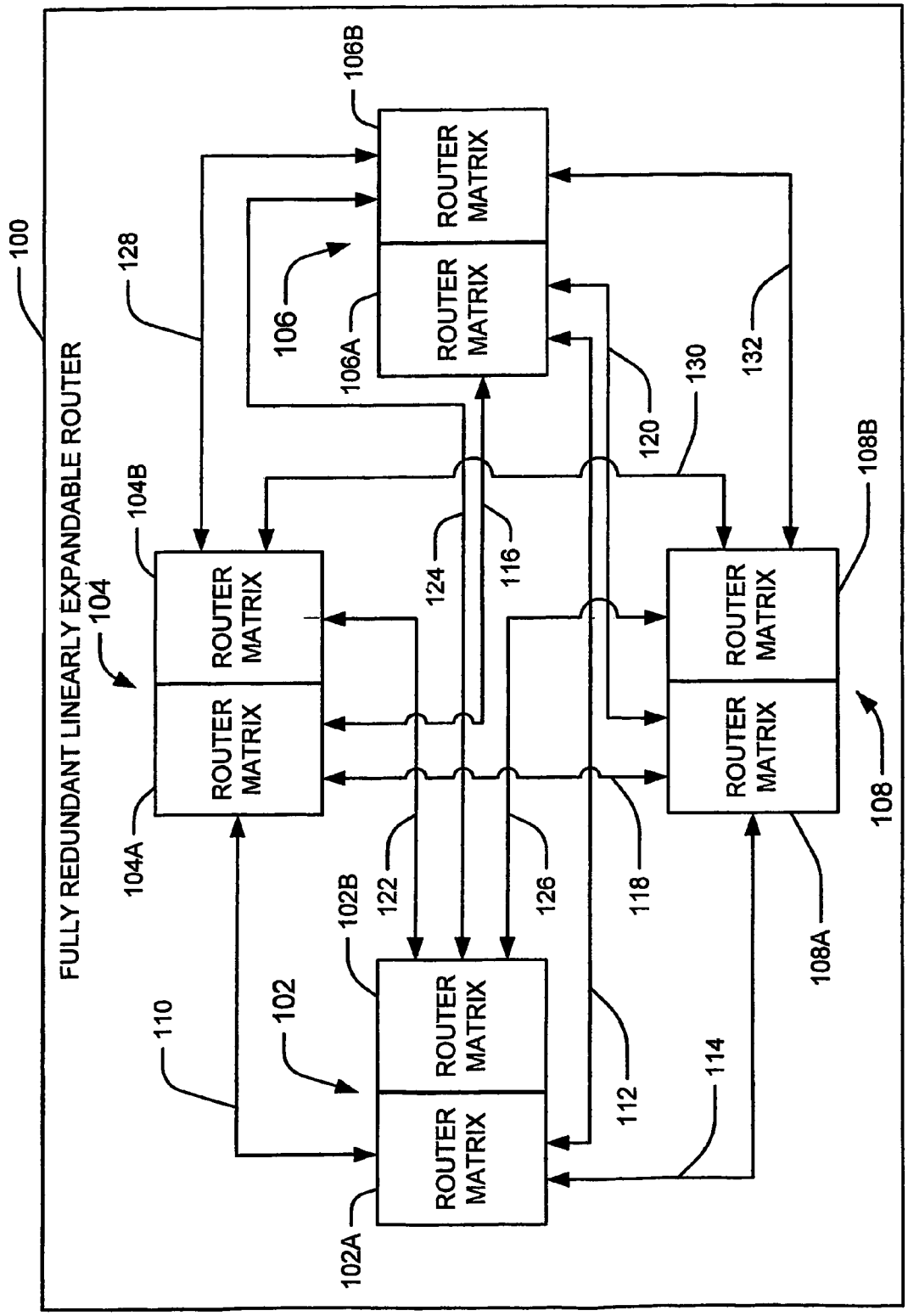
FIG. 1 is a block diagram of a fully redundant linearly expandable broadcast router constructed in accordance with the teachings of the present invention.

Referring first to FIG. 1, a broadcast router 100 which has been configured for alternately receiving multiple or redundant reference inputs in accordance with the teachings of the present invention will now be described in greater detail. As disclosed herein, the broadcast router 100 is a fully redundant linearly expandable broadcast router. It should be clearly understood, however, that it is fully contemplated that other types of broadcast routers besides the specific type of broadcast router disclosed herein may be configured for alternately receiving multiple or redundant reference inputs as well. As may now be seen, the fully redundant linearly expandable broadcast router 100 is comprised of plural broadcast router components coupled to one another to form the larger fully redundant linearly expandable broadcast router 100. Each broadcast router component is a discrete router device which includes first and second router matrices, the second router matrix being redundant of the first router matrix. Thus, each broadcast router has first and second routing engines, one for each of the first and second router matrices, each receiving, at an input side thereof, the same input digital audio streams and placing, at an output side thereof, the same output digital audio streams. As disclosed herein, each of the broadcast router components used to construct the fully redundant linearly expandable broadcast router are N×M sized broadcast routers. However, it is fully contemplated that the fully redundant linearly expandable broadcast router 100 could instead be constructed of broadcast router components of different sizes relative to one another.

As further disclosed herein, the fully redundant linearly expandable broadcast router 100 is formed by coupling together first, second, third and fourth broadcast router components 102, 104, 106 and 108. Of course, the present disclosure of the fully redundant linearly expandable broadcast router 100 as being formed of four broadcast router components is purely by way of example. Accordingly, it should be clearly understood that a fully redundant linearly expandable broadcast router constructed in accordance with the teachings of the present invention may be formed using various other numbers of broadcast router components as long as the total number of broadcast router components which collectively form the linearly expandable broadcast router is equal to or greater than three. The first, second, third and fourth broadcast router components 102, 104, 106 and 108 which, when fully connected in the manner disclosed herein, collectively form the fully redundant linearly expandable broadcast router 100, may either be housed together in a common chassis as illustrated in FIG. 1 or, if desired, housed in separate chassis. While, as previously set forth, the broadcast router components 102, 104, 106 and 108 may have different sizes relative to one another or, in the alternative, may all have the same N×M size, one size that has proven suitable for the uses contemplated herein is 256×256. Furthermore, a suitable configuration for the fully redundant linear expandable broadcast router 100 would be to couple five broadcast router components, each sized at 256×256, thereby resulting in a 1,280×1,280 broadcast router.

The first broadcast router component 102 is comprised of a first router matrix 102a and a second (or redundant) router matrix 102b used to replace the first router matrix 102a in the event of a failure thereof. Similarly, each one of the second, third and fourth broadcast router components 104, 106, and 108 of the fully redundant linearly expandable broadcast router 100 are comprised of a first router matrix 104a, 106a and 108a, respectively, and a second (or redundant) router matrix 104b, 106b and 108b, respectively, used to replace the first router matrix 104a, 106a and 108a, respectively, in the event of a failure thereof. Of course, the designation of the second router matrices 102b, 104b, 106b and 108b as backups for the first router matrices 102a, 104a, 106a and 108a, respectively, is purely arbitrary and it is fully contemplated that any either of a router matrix pair residing within a broadcast router component may act as a backup for the other of the router matrix pair residing within that broadcast router component.

As may be further seen in FIG. 1, the first router matrix 102a of the first broadcast router component 102, the first router matrix 104a of the second broadcast router component 104, the first router matrix 106a of the third broadcast router component 106 and the first router matrix 108a of the fourth broadcast router component 108 are coupled together in a first arrangement of router matrices which conforms to a fully connected topology. Similarly, the second router matrix 102b of the first broadcast router component 102, the second router matrix 104b of the second broadcast router component 104, the second router matrix 106b of the third broadcast router component 106 and the second router matrix 108b of the fourth broadcast router component 108 are coupled together in a second arrangement which, like the first arrangement, conforms to a fully connected topology. In a fully connected topology, each router matrix of an arrangement of router matrices is coupled, by a discrete link, to each and every other router matrix forming part of the arrangement of router matrices.

Thus, for the first arrangement of router matrices, first, second and third bi-directional links 110, 112 and 114 couples the first router matrix 102a of the first broadcast router component 102 to the first router matrix 104a of the second broadcast router component 104, the first router matrix 106a of the third broadcast router component 106 and the first router matrix 108a of the fourth broadcast router component 108, respectively. Additionally, fourth and fifth bi-directional links 116 and 118 couple the first router matrix 104a of the second broadcast router component 104 to the first router matrix 106a of the third broadcast router component 106 and the first router matrix 108a of the fourth broadcast router component 108, respectively. Finally, a sixth bi-directional link 120 couples the first router matrix 106a of the third broadcast router component 106 to the first router matrix 108a of the fourth broadcast router component 108. Variously, the bidirectional links 110 through 120 may be formed of copper wire, optical fiber or another transmission medium deemed suitable for the exchange of digital signals.

Similarly, for the second arrangement of router matrices, first, second and third bi-directional links 122, 124 and 126 couples the second router matrix 102b of the first broadcast router component 102 to the second router matrix 104b of the second broadcast router component 104, the second router matrix 106b of the third broadcast router component 106 and the second router matrix 108b of the fourth broadcast router component 108, respectively. Additionally, fourth and fifth bi-directional links 128 and 130 couple the second router matrix 104b of the second broadcast router component 104 to the second router matrix 106b of the third broadcast router component 106 and the second router matrix 108b of the fourth broadcast router component 108, respectively. Finally, a sixth bi-directional link 132 couples the second router matrix 106b of the third broadcast router component 106 to the second router matrix 108b of the fourth broadcast router component 108. Again, the bi-directional links 122 through 132 may be formed of copper wire, optical fiber or another transmission medium deemed suitable for the exchange of digital signals. Of course, rather than the single bi-directional links between pairs of router matrices illustrated in FIG. 1, in an alternate embodiment of the invention, it is contemplated that the pairs of router matrices may instead be coupled together by first and second unidirectional links. Such an alternate configuration is illustrated in FIG. 2.

Figure 2:
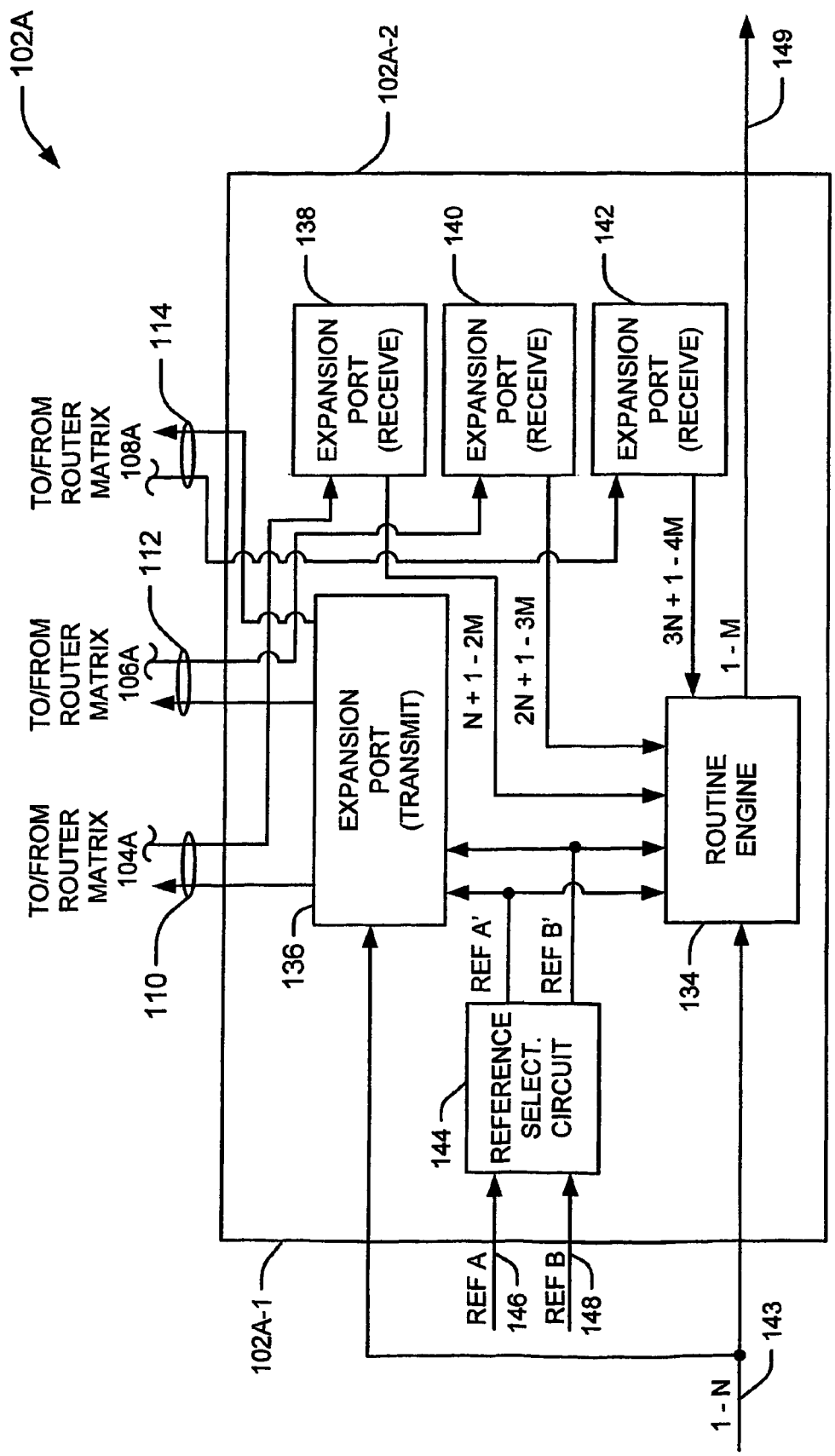
FIG. 2 is an expanded block diagram of a router matrix of the broadcast router of FIG. 1.

Referring next to FIG. 2, the first router matrix 102a of the first broadcast router component 102 will now be described in greater detail. As may now be seen, the first router matrix 102a of the first broadcast router component 102 is comprised of a routing engine 134, a transmit expansion port 136, a first receive expansion port 138, a second receive expansion port 140, a third receive expansion port 142 and a reference select circuit 144. By the term "transmit" expansion port, it is intended to refer to an expansion port from which data is transmitted to a selected destination. Similarly, by the term "receive" expansion port, it is intended to refer to an expansion port which receives data from a destination. Residing within the routing engine 134 is switching means (not shown) for assigning any one of plural input digital audio data signals received as inputs to the routing engine 134 to any one of plural output lines of the routing engine 134. Variously, it is contemplated that the routing engine 134 may be embodied in software, for example, as a series of instructions; hardware, for example, as a series of logic circuits; or a combination thereof. In a broad sense, the transmit expansion port 136 of the first router matrix 102a of the first broadcast router component 102 is comprised of a memory subsystem (not shown) in which plural input digital audio data streams may be buffered before transfer to their final destinations and a processor subsystem (also not shown) for controlling the transfer of the plural input digital audio data streams received by the transmit expansion port 136 to a receive expansion port of the first router matrix of another broadcast router component. Conversely, each one of the first, second and third receive expansion ports 138, 140 and 142 of the first router matrix 102a are, in a broad sense, comprised of a memory subsystem (not shown) in which plural input digital audio data streams received from a transmit expansion port of a first router matrix of another broadcast router component may be buffered before transfer to their final destination and a processor subsystem (also not shown) for controlling the transfer of the input digital audio data streams received from the receive expansion port of the first router matrix of the other broadcast router component to inputs of the routing engine 134.

The router matrix 102a includes an input side 102a-1 equipped with one or more data inputs 143 and an output side 102a-2 equipped with one or more data outputs 149. N input digital audio data streams are received by the one or more data inputs 143 and transported to the routing engine 134 and the transmit expansion port 136. It is contemplated that the router matrix 102a shall conform to either the Audio Engineering Society-3 (or "AES-3") standard or the multichannel digital audio interface (or "MADI") standard set forth in the AES-10 standard. In this regard, it should be noted that a MADI input digital audio data stream may contain up to 32 AES-3 digital audio data streams. Accordingly, if the AES-3 standard is used, the router matrix 102a will require N inputs 143 to receive the N digital audio data streams to be transported to the routing engine 134 and the transmit expansion port 136. Conversely, if the MADI standard is used, the router matrix 102a will need only N/32 inputs 143 to receive the N digital audio data streams to be transported to the routing engine 134 and the transmit expansion port 136. Of course, extraction circuitry (not shown), within the router matrix 102a, would be needed to extract the N AES-3 input digital audio data streams from the MADI input digital audio data stream. Of course, it should be readily appreciated that other types of input data streams other than the input digital audio streams disclosed herein are equally suitable for use with the first router matrix 102a of the first broadcast router component 102. For example, it is contemplated that the first router matrix 102a of the first broadcast router component 102 may instead be used with other low bandwidth digital signals such as compressed video and data signals. It is further contemplated that, with minor modifications, for example, faster hardware, the first router matrix 102a of the first broadcast router component 102 may be used with non-compressed digital video signals.

Input digital audio data streams 1 through N are fed into the routing engine 134 and the transmit expansion port 136 of the first router matrix 102a of the first broadcast router component 102. From the transmit expansion port 136, input digital audio data streams 1 through N are forwarded to a receive expansion port (not shown) of the first router matrix 104a of the second broadcast router component 104 over the link 110, a receive expansion port (also not shown) of the first router matrix 106a of the third broadcast router component 106 over the link 112 and a receive expansion port (also not shown) of the fourth router matrix 108a of the fourth broadcast router component 108 over the link 114. In turn, input digital audio data streams N+1 through 2N are transmitted, by a transmit expansion port (not shown) of the first router matrix 104a of the second broadcast router component 104, to the first receive expansion port 138 over the link 110, input digital audio data streams 2N+1 through 3N are transmitted, by a transmit expansion port (also not shown) of the first router matrix 106a of the third broadcast router component 106, to the second receive expansion port 140 over the link 112 and input digital audio data streams 3N+1 through 4N are transmitted, by a transmit expansion port (also not shown) of the first router matrix 108a of the fourth broadcast router components 108, to the third receive expansion port 142 over the link 114. Finally, input digital audio data streams N+1 through 2N are fed into the routing engine 134 by the first receive expansion port 138, input digital audio data streams 2N+1 through 3N are fed into the routing engine 134 by the second receive expansion port 140 and input digital audio data streams 3N+1 through 4N are fed into the routing engine 134 by the third receive expansion port 142.

The router matrix 102a utilizes a non-traditional approach to the synchronization of input and/or output signals. More specifically, rather than continually aligning the input and/or output signals to a reference signal, the router matrix 102a will align a signal with the reference signal only once. If the signal to be aligned is a synchronous signal, it will stay aligned. Conversely, if the signal to be aligned is not a synchronous signal, while it won't stay aligned, it will not be damaged in any way. Because synchronization is achieved using a single alignment with the reference signal, the router matrix 102a performs the same with a correct reference signal, an incorrect reference signal or a missing reference signal. Of course, there are a number of conditions, including acquiring a new input signal, switching to a different input signal and acquiring a new reference signal, which will cause the router matrix to subsequently perform another re-alignment with the reference signal.

Turning to FIG. 2, therefore, the configuration of the router matrix 102a will allows for the selective receipt of multiple or redundant inputs will now be described in greater detail.

As may now be seen, the router matrix 102a further includes a first reference input 146 and a second reference input 148. As previously set forth, the first and second reference inputs 146 and 148 may be used, depending on user preference, to provide a redundant reference input or multiple reference inputs to the router matrix 102a If the user prefers that the second reference input 148 be used to provide a redundant reference input to the router matrix 102a, REF A, the signal applied to the first reference input 146 by the user would be generally identical to REF B, the signal applied by the user to the second reference input 148. While generally identical, however, to ensure the availability of REF B in the event that REF A is lost, it is preferred that REF A and REF B are supplied by discrete signal sources. Conversely, if the user prefers that the first and second reference inputs 146 and 148 are used to provide multiple reference inputs to the router matrix 102a, reference signal REF A would be different from reference signal REF B. For example, REF A may have a frequency of 60 MHz while REF B may have a frequency of 50 MHz.

The reference signals REF A and REF B applied to first and second inputs 146 and 148, respectively, are fed into the reference select circuit 144. In turn, the reference select circuit 144 propagates corresponding reference signals REF A' and REF B' for use by one or more reference signal-demanding components of the router matrix 102a. As illustrated in FIG. 2, each one of the reference signals REF A' and REF B' output the reference select circuit 144 are transferred to the routing engine 134 and the transmit expansion port 136. It should be noted, however, that it is fully contemplated that each one of the reference signals REF A' and REF B' output the reference select circuit 134 are also transferred to each one of the first, second and third receive expansion ports 138, 140 and 142 but that the interconnections necessary to show such transfers were omitted from FIG. 2 to maintain clarity of the drawing. It should also be clearly understood that it is further contemplated that the aforementioned reference signals may also be propagated to any number of other components of the router matrix 102a which were omitted from FIG. 2 for ease of description. Finally, it should be understood that the foregoing disclosure of the router matrix 102a as having first and second reference inputs 146 and 148 to which first and second reference signals are applied is purely by way of example and it is fully contemplated that the router matrix 102a may, if desired, have any number of additional reference inputs to which additional discrete reference signals and/or additional redundant reference signals may be applied.

Figure 3:
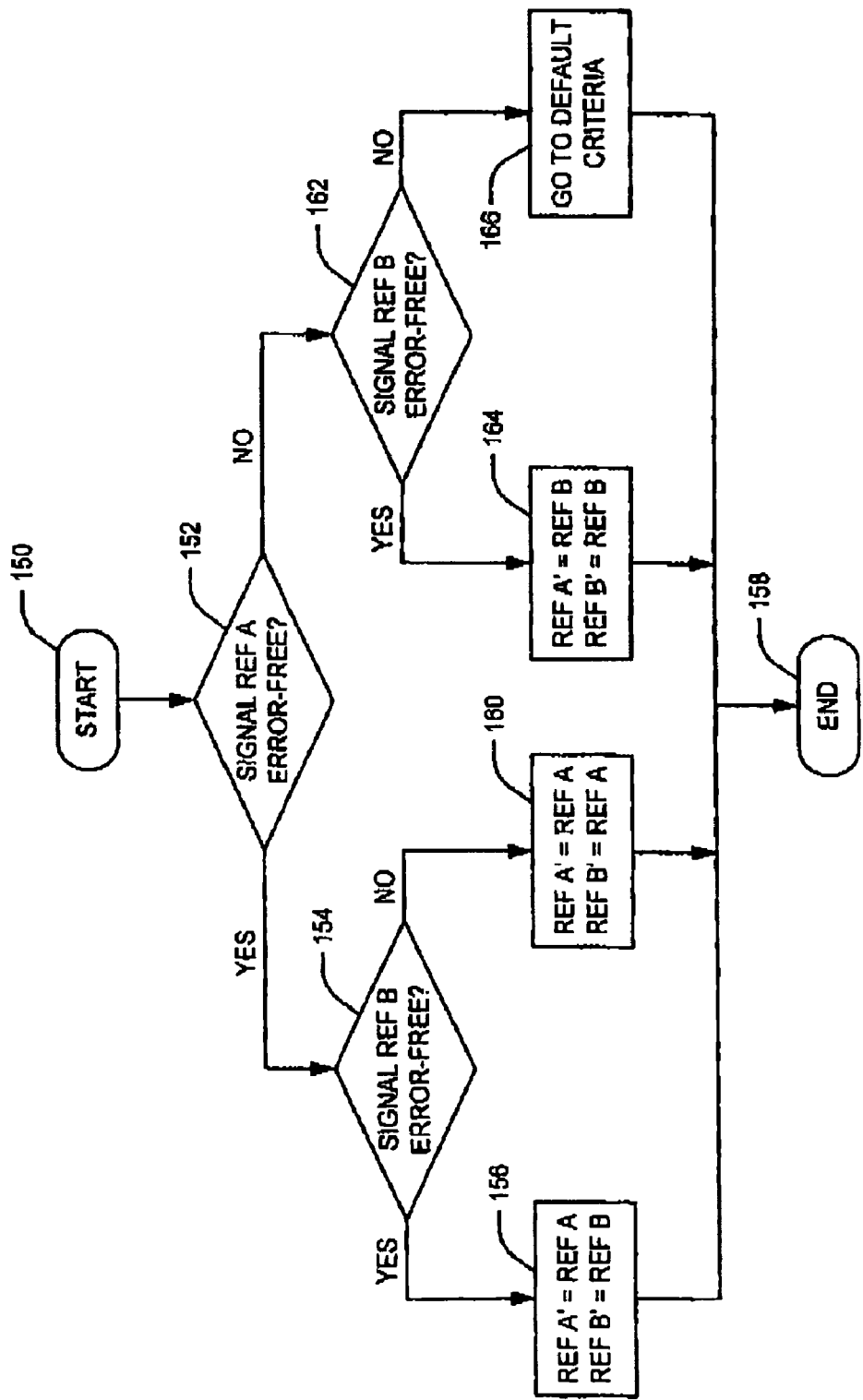
FIG. 3 is a flow chart of a method of selectively providing multiple or redundant reference inputs to the broadcast router of FIG. 1.

Referring next to FIG. 3, the method by which the reference select circuit 144 determines which signals to be output as reference signals REF A' and REF B' will now be described in greater detail. The method commences at step 150 and, at step 152, the reference select circuit detect circuit 144 determines if the reference signal REF A is "error-free". As disclosed herein, the term "error-free" is hereby defined as indicating that the reference signal is present and "locked". In turn, the term "locked" is hereby defined as indicating that the frequency of the reference signal is relatively constant. If the reference signal REF A is error-free, the method continues on to step 154 where the reference select circuit 144 determines if the reference signal REF B is error-free. If the reference select circuit 144 determines that the reference signal REF B is also error-free, the method proceeds to step 156 where the reference select circuit 144 sets the reference signal REF A' to the reference signal REF A and the reference signal REF B' to the reference signal REF B. Having selected the reference signals to be used as the reference signals REF A' and REF B', the method would then end at step 158.

Returning to step 154, if, however, the reference select circuit 144 determines that the reference signal REF B is not error-free, i.e., the REF B signal is either absent or the frequency is changing excessively, the method will instead proceed to step 160 where the reference select circuit 144 sets the reference signal REF A' to the reference signal REF A and sets the reference signal REF B' to the reference signal REF A. Again, having selected the reference signals to be used as the reference signals REF A' and REF B', the method would then end at step 158.

Returning to step 152, if, however, the reference select circuit 144 determines that the reference signal REF A is not error-free, i.e., the REF A signal is either absent or the frequency is changing excessively, the method will instead proceed to step 162. At step 162, the reference select circuit 144 will determine if the reference signal REF B is present. If it is determined that the reference signal REF B is error-free, the method will continue on to step 164 where the reference select circuit 144 sets the reference signal REF A' to the reference signal REF B and sets the reference signal REF B' to the reference signal REF B. Again, having selected the reference signals to be used as the reference signals REF A' and REF B', the method would then end at step 158. If, however, the reference select circuit 144 determines, at step 162, that the reference signal REF B is not present, the method will proceed to step 166 where the reference select circuit 144 will set the reference signals REF A' and REF B' based upon a set of pre-selected default criteria. It is contemplated that a variety of default criteria may be used. For example, one pre-selected set of default criteria may be that, in the absence of either the reference signal REF A or the reference signal REF B, the reference select circuit 144 may generate a 60 MHz signal for output as the reference signal REF A' and the reference select circuit 144 may generate a 50 MHz signal for output as the reference signal REF B'. Alternately, the reference select circuit 144 may be configured such that, in the absence of either the reference signal REF A or the reference signal REF B, the reference select circuit 144 may decline to provide either the reference signal REF A' or the reference signal B'. In such a configuration, the components of the router matrix 102a which receive the reference signal A' and/or the reference signal B' from the reference select circuit 144 should be configured for operation in the absence of such reference signals.

It is noted that, in accordance with the method set forth above, the reference select circuit 144 will periodically transmit one reference signal, for example, REF A, in place of another reference signal, for example, REF B. However, because the router matrix 102a synchronizes a signal with the reference signal only once, that signal will not be damaged in the event that a non-identical reference signal is used in place of a missing or bad reference signal.

Furthermore, by configuring the first broadcast router component 102a to include the first reference input 146, the second reference input 148 and the reference select circuit 144, a broadcast router which may be selectively operated with multiple or redundant reference signals has been achieved. If a user desires to operate the first broadcast router component 102a with redundant reference inputs, the user need only to hook copies of the same signal to both the first reference input 146 and the second reference input 148. Conversely, if a user desires to operate the first broadcast router component 102a with multiple independent references, the user need only to hook a copy of the first signal to the first reference input 146 and hook a copy of the second signal to the second reference input 148. No further setup and/or modification by the user is required for selecting between these alternate modes of operation.

Thus, there has been disclosed and illustrated herein a broadcast router configured for alternately receiving multiple or redundant reference inputs. Of course, while preferred embodiments of this invention have been shown and described herein, various modifications and other changes can be made by one skilled in the art to which the invention pertains without departing from the spirit or teaching of this invention. Accordingly, the scope of protection is not limited to the embodiments described herein, but is only limited by the claims that follow.

The invention claimed is:

1. A broadcast router, comprising:
a first reference input;
a second reference input;
a reference select circuit coupled to said first and second reference inputs; and
at least one router component coupled to said reference select circuit;
wherein said reference select circuit: (1) passes a first signal applied to said first reference input to said at least one router component as a first reference signal and a second signal applied to said second reference input to said at least one router component as a second reference signal in response to determining that said first and second signals are error-free; (2) passes said first signal to said at least one router component as said first reference signal and as said second reference signal in response to determining that said first signal is error-free and said second signal is not error-free; and (3) passes said second signal to said at least one router component as said first reference signal and as said second reference signal in response to determining that said first signal is not error-free and said second signal is error-free.

2. The apparatus of claim 1, wherein said at least one router component further comprises a router matrix.

3. The apparatus of claim 1, wherein said at least one router component further comprises a transmit expansion port.

4. The apparatus of claim 1, wherein said at least one router component further comprises at least one receive expansion port.

5. The apparatus of claim 1, wherein at least one of said reference inputs is configured to readily receive either independent or redundant reference signals without modification of the at least one of said reference inputs by a user.

6. The apparatus of claim 1, wherein said at least one router component synchronizes at least one other signal by aligning said at least one other signal with at least one of said reference signals once while processing said at least one other signal.

7. A broadcast router, comprising:

a router matrix having an input side and an output side;

N data inputs coupled to said input side of said router matrix, each one of said N data inputs configured for providing an input data stream to said router matrix;

M data outputs coupled to said output side of said router matrix, each one of said M data outputs configured for providing an output data stream from said router matrix;

a first reference input coupled to said input side of said router matrix said first reference input configured for application of a first reference signal thereto; and a second reference input coupled to said input side of said router matrix, said second reference input configured for selective application of either a second reference signal or a redundancy of said first reference signal thereto, wherein said broadcast router further comprises a reference select circuit coupled between said first and second reference inputs and a routing engine, said reference select circuit configured to (1) pass a first signal applied to said first reference input to said routing engine as a first reference signal and a second signal applied to said second reference input to said routing engine as a second reference signal in response to determining that said first and second signals are error-free; (2) pass said first signal to said routing engine as said first reference signal and as said second reference signal in response to determining that said first signal is error-free and said second signal is not error-free; and (3) pass said second signal to said routing engine as said first reference signal and as said second reference signal in response to determining that said first signal is not error-free and said second signal is error-free.

8. The apparatus of claim 7, wherein said routing engine is coupled between said N data inputs and said M data outputs and said routing engine is configured to apply selected ones of said N data inputs to said M data outputs.

9. The apparatus of claim 7, wherein at least one of said reference inputs is configured to readily receive either independent or redundant reference signals without modification of the at least one of said reference inputs by a user.

10. The apparatus of claim 7, wherein said router matrix synchronizes at least one other signal by aligning said at least one other signal with at least one of said reference signals once while processing said at least one other signal.

11. A method for selectively providing multiple or redundant reference inputs to a broadcast router, comprising:

providing a broadcast router having first and second reference inputs;

applying a first reference signal to said first reference input; and applying one of said first reference signal or a second reference signal to said second reference input such that said first reference signal is applied to said second reference input if a user desires that said broadcast router operate with redundant reference signals, and said second reference signal is applied to said second reference input if said user desires that said broadcast router operate with multiple reference signals, wherein said broadcast router includes a reference select circuit to which said first and second reference inputs are fed, said reference select circuit configured to (1) pass signals applied to said first reference input to reference signal-demanding components of said broadcast router as a first reference input signal and signals applied to said second reference input to said reference signal-demanding components of said broadcast router as a second reference input signal in response to determining that said signals applied to said first and second reference inputs are error-free; (2) pass signals applied to said first reference input to said reference signal-demanding components of said broadcast router as said first reference input signal and as said second reference input signal in response to determining that signals applied to said first reference input are error-free but signals applied to said second reference input are not error-free; and (3) pass signals applied to said second reference input to said reference signal-demanding components of said broadcast router as said first reference input signal and as said second reference input signal in response to determining that signals applied to said first reference input are not error-free but signals applied to said second reference input are error free.

12. The method of claim 11, wherein said reference signal-demanding components are reference signal-insensitive.

13. The method of claim 11, wherein at least one of said reference inputs is configured to readily receive either independent or redundant reference signals without modification of the at least one of said reference inputs by said user.

14. The method of claim 11, further comprising the step of:

synchronizing at least one other signal by aligning said at least one other signal with at least one of said reference signals once while processing said at least one other signal.

\* \* \* \* \*